United States Patent [19]
Sakaki et al.

[11] Patent Number: 5,459,880
[45] Date of Patent: Oct. 24, 1995

[54] GLOVES AND METHOD OF MANUFACTURING THE SAME

[75] Inventors: Toshiaki Sakaki, Kakogawa, Japan; Daijiro Toji, Kedah, Malaysia

[73] Assignee: Sumitomo Rubber Industries, Ltd., Hyogo, Japan

[21] Appl. No.: 364,513

[22] Filed: Dec. 27, 1994

Related U.S. Application Data

[63] Continuation of Ser. No. 144,541, Nov. 1, 1993, abandoned, which is a continuation of Ser. No. 874,910, Apr. 28, 1992, abandoned.

[30] Foreign Application Priority Data

Apr. 30, 1991 [JP] Japan ................................. 3-099194

[51] Int. Cl.$^6$ .................................................. A41D 19/00
[52] U.S. Cl. ............................................ 2/168; 2/161.6
[58] Field of Search ........................ 2/168, 159, 161.6, 2/161.7, 161.8, 167, 168; 427/2.1, 2.3, 302; 428/213, 332, 492, 494; 264/137, 305, 255

[56] References Cited

U.S. PATENT DOCUMENTS

| | | | |
|---|---|---|---|
| 2,173,734 | 9/1939 | Sidnell | 2/168 |
| 2,989,755 | 6/1961 | O'Brien et al. | 2/168 |
| 3,382,138 | 5/1968 | Barth | 2/168 X |
| 4,218,779 | 8/1980 | Hart et al. | 2/168 |

FOREIGN PATENT DOCUMENTS

| | | | |
|---|---|---|---|
| 232370 | 7/1959 | Australia | 2/168 |
| 2603015 | 7/1977 | Germany | 2/168 |
| 782520 | 9/1957 | United Kingdom | 2/168 |
| 1359162 | 7/1974 | United Kingdom . | |

*Primary Examiner*—Clifford D. Crowder
*Assistant Examiner*—Amy Brooke Vanatta
*Attorney, Agent, or Firm*—Nikaido, Marmelstein, Murray & Oram

[57] ABSTRACT

The glove according to the present invention has, at least partially, a laminated part 2 in which a plurality of different types of rubbers are successively laminated. In the laminated part 2, the lowermost layer is a natural rubber layer, and the top surface layer is an oil-resistant rubber layer (for example, an acrylonitrile-butadiene rubber layer). The glove manufacturing method according to the present invention comprises the steps of immersing a glove mold in natural rubber latex containing a heat-sensitive coagulant to form a coating of the lowermost layer on the mold surface, and immersing at least a part of the lowermost layer in another rubber latex different from the first-mentioned rubber latex. The glove of the present invention has high strength and is economical and excellent in oil resistance and solvent resistance.

3 Claims, 2 Drawing Sheets

GLOVES AND METHOD OF MANUFACTURING THE SAME

This application is a continuation of application Ser. No. 08/144,541 filed Nov. 1, 1993, now abandoned, which is a continuation of application Ser. No. 07/874,910, filed Apr. 28, 1992, now abandoned.

BACKGROUND OF THE INVENTION

The present invention relates to gloves made of a rubber material and a method of manufacturing such gloves.

Generally, natural rubber which is economical and has high strength, is mainly used as the material of gloves. However, the natural rubber is poor in oil resistance. On the other hand, gloves made of synthetic rubber, particularly acrylonitrile-butadiene rubber excellent in oil resistance, are advantageous in view of its resistance to an organic solvent and oil, but are disadvantageously expensive and poor in strength and tearing.

SUMMARY OF THE INVENTION

It is a main object of the present invention to provide economical gloves excellent in strength, oil resistance and solvent resistance, and also to provide a method of manufacturing such gloves.

To achieve the object above-mentioned, the glove of the present invention is formed by a latex immersion method and has, at least partially, a laminated part in which a plurality of different types of rubbers are successively laminated, of which the lower-most rubber layer is formed by a natural rubber layer and of which the top surface layer is formed by an oil-resistant rubber layer.

In such a glove of the present invention, the lowermost layer in the laminated part is formed by a natural rubber layer and the top surface layer is formed by an oil-resistant rubber layer, so that the glove has high strength and is economical and excellent in oil resistance and solvent resistance.

The glove manufacturing method of the present invention comprises the steps of immersing a previously heated glove mold with or without a glove body made of a knitted, woven or unwoven fabric mounted thereon, in natural rubber latex containing a heat-sensitive coagulant, thereby to form a film of the lowermost layer on the surface of the mold or of the glove body, and immersing at least a part of the lowermost layer in another rubber latex different from the first-mentioned rubber latex, thereby to laminate, on the surface of the coating of the lowermost layer, a coating different from the first-mentioned coating, the laminating step being repeated one or more times, thereby to partially form a laminated part in which a plurality of different types of rubber layers are successively being laminated.

According to the method of the present invention, the lowermost layer is formed by immersing a previously heated glove mold in rubber latex containing a heat-sensitive coagulant, and a surface layer is then laminated on the surface of the lowermost layer, thus preparing a glove in which layers made of a plurality of different types of rubbers are being bonded to one another with such bonding strength as to be sufficient in view of practical use.

DETAILED DESCRIPTION OF THE INVENTION

According to the present invention, an acrylonitrile-butadiene rubber layer may be suitably used as an oil-resistant rubber layer forming the top surface layer.

According to the present invention, the number of layers in the laminated part is not limited to a certain number and, between the natural rubber layer and the oil-resistant rubber layer, there may be interposed a plurality of layers made of other rubbers.

According to a preferred embodiment of the present invention, the rubber layers comprise two layers, i.e., a natural rubber layer as the lowermost layer and an acrylonitrile-butadiene rubber layer as the top surface layer.

Examples of the latex immersion method used in manufacturing the gloves of the present invention include, in addition to a film-forming method by mere immersion in rubber latex, a coagulation method in which rubber particles are coagulated with the use of static electricity, a heat-sensitive method using rubber latex containing a heat-sensitive coagulant, and the like.

According to the coagulation method, cations (calcium ions and the like) are sticked to the surface of a glove mold, which is then immersed in rubber latex. Rubber particles in the latex which are negatively electrically charged, are attracted to the cations and coagulated on the mold surface, thereby to form a rubber layer. Then, the mold is pulled out from the latex, and dried and vulcanized to form a rubber film.

According to the heat-sensitive method, a previously heated mold is immersed in rubber latex containing a heat-sensitive coagulant, so that the latex containing a heat-sensitive coagulant is gelled on the mold surface. Then, the mold is pulled out from the latex, and dried and vulcanized to obtain a glove.

Figure 1:
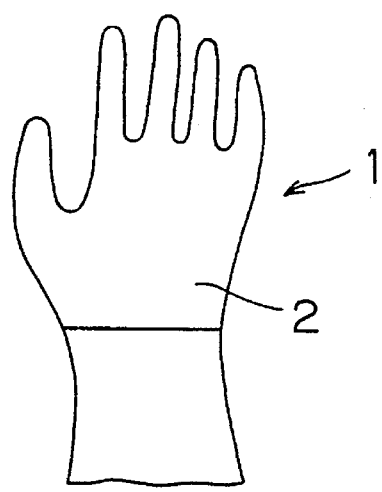
FIG. 1 is a plan view of glove in accordance with an embodiment of the present invention.
Figure 2:
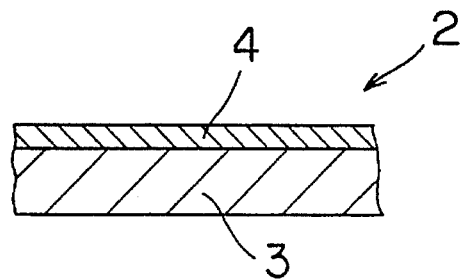
FIG. 2 is a section view of a laminated part of the glove in accordance with the present invention.

In FIG. 1, a glove 1 has a laminated part 2 at the hand portion except for the wrist portion. FIG. 2 shows a sectional structure of the laminated part 2, in which a surface layer 4 is laminated on the lower rubber layer 3 which forms a film of the glove 1. A natural rubber layer may be used as the lower layer 3, and an oil-resistant rubber layer, particularly an acrylonitrile-butadiene rubber layer, may be suitably used as the surface layer 4 to improve the glove in oil resistance and solvent resistance. The lower layer 3 may be formed by a coagulation method or a heat-sensitive method.

Figure 3A:
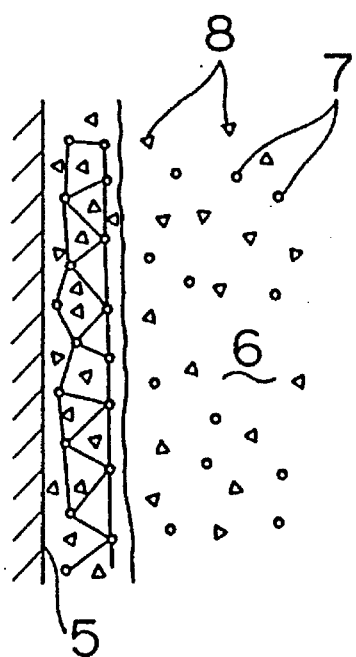
FIG. 3 is a schematic view illustrating the outline of a heat-sensitive method using rubber latex containing a heat-sensitive coagulant in accordance with the present invention.
Figure 3B:
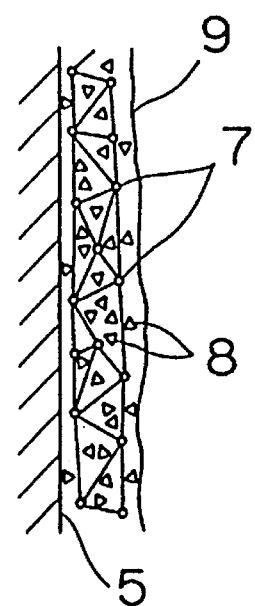
Figure 3C:
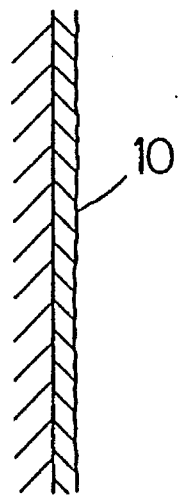

FIGS. 3 (a) to (c) are schematic views illustrating the outline of the heat-sensitive method. FIG. 3 (a) shows the step where a heat-sensitive coagulant 7 is coagulated on the surface of a mold 5 immersed in rubber latex 6, thus forming a net-like structure in which rubber particles 8 are incorporated. FIG. 3 (b) shows the step where the mold 5 is pulled out from the latex 6 with a great amount of water contained in a film 9. When the film 9 is dried, there is formed a dry film 10 containing the heat-sensitive coagulant 7 as shown in FIG. 3 (c).

Examples of the heat-sensitive coagulant which can be used in the present invention, include polymer-type coagulants such as polyvinyl methyl ether, polyalkylene glycol, polyether polyformal, functional polysiloxane and the like, and also include a variety of zinc ammonium complex salts, sodium silicofluoride, ammonium nitrate, ammonia zinc acetate, diphenyl guanidine, trypsin, triacetin, nitromethane, nitropropane, zinc salt of 2-mercaptobenzothiazole, 2-mercaptobenzoimidazole, 4,5-methyl mercaptobenzoimidazole and the like.

The blending ratio of the heat-sensitive coagulant in the rubber latex is suitably in a range from 0.5 to 5 parts by weight for 100 parts by weight of the rubber component. The rubber latex contains, in addition to such a heat-sensitive coagulant, a variety of known additives such as a vulcanizer, a stabilizer and the like.

The mold pre-heating temperature can be suitably determined according to the heat-sensitive coagulant and rubber materials to be used. Generally, the mold is pre-heated to about 100° C.

For laminating different types of rubbers, as shown in FIG. 2 the lower layer 3 may be first formed by the heat-sensitive method and then immersed in another rubber latex different from that used for forming the lower layer 3 or such different rubber latex is applied to the lower layer 3, thereby to form the surface layer 4. To improve the adhesion between the layers 3, 4, such immersion in or application with the different rubber latex is preferably conducted on the lower layer 3 as just pulled out from the rubber latex or as dried to such an extent that the lower layer 3 contains water; that is, the lower layer 3 is still in the form of the film 9 in FIG. 3 (b). The reason of why the adhesion is improved, is not apparent. However, it is presumed that, since the film 9 obtained by the heat-sensitive method contains a great amount of water when the film 9 is in a gelled state, the rubber components of the both layers 3, 4 are mixed with each other at the interfaces thereof so that the rubber molecules are entangled with one another, when the surface layer 4 is formed.

The surface layer 4 can be formed by merely immersing the lower layer 3 in rubber latex. In the lamination of natural rubber and acrylonitrile-butadiene rubber above-mentioned, the thickness of the natural rubber layer forming the lower layer 3 may be in a range from about 0.3 to about 2.0 mm, and the thickness of the acrylonitrile-butadiene rubber layer forming the surface layer 4 may be in a range from about 0.03 to about 0.10 mm. When the surface layer 4 is as thin as in the range above-mentioned, the surface layer 4 can be formed by merely immersing the lower layer 3 in rubber latex containing no heat-sensitive coagulant.

After the surface layer 4 has been formed, the layers 3, 4 are dried and then vulcanized to obtain the glove 1 of the present invention. It is required to vulcanize the layers 3, 4 after being dried. If the layers 3, 4 will are suddenly heated without being dried, this involves the likelihood that the layers 3, 4 partially come off or separate from each other.

The rubber latex for forming the surface layer 4 can be used singly. To form non-slip projections on the surface of a working glove, it is possible to disperse, in the rubber latex, polyurethane powder, polyvinyl chloride powder or a filler such as calcium carbonate, silica or the like. A known thickening agent may be added to increase the latex in viscosity. This can not only thicken the film, but also restrain the powder from precipitating. Pigments may also be added as necessary.

The water content of the rubber latex for forming the surface layer 4, has a great influence upon the adhesion between the lower layer 3 and the surface layer 4. More specifically, if the entire solid content of the rubber latex for forming the surface layer 4 (the total sum of rubber content, polyurethane powder and the like) is below 30% by weight, the adhesion is greatly lowered. Accordingly, the water content of the rubber latex for forming the surface layer 4 is preferably in a range from 30 to 70% by weight, and more preferably from 30 to 65% by weight. It is required that the water content of the rubber latex for forming the surface layer 4 is higher than the water content of the rubber latex for forming the lower layer 3. When the lower layer 3 is made of natural rubber, the water content of the natural rubber latex is suitably in a range from about 40 to about 60% by weight.

The rubber materials to be used are not limited to specific ones. Dependent on applications, there may be used, in addition to the combination of natural rubber and acrylonitrile-butadiene rubber above-mentioned, (i) styrene-butadiene rubber, butadiene rubber, isoprene rubber, butyl rubber, EPM or EPDM, or any of blends of the rubbers above-mentioned instead of the natural rubber, and (ii) chloroprene rubber, acrylic rubber or urethane rubber, or any of blends of the rubbers above-mentioned instead of the acryloni- trile-butadiene rubber. The number of laminated layers may be two or more. Examples of the latex of acryloni- trile-butadiene rubber include "LX520B" manufactured by Nippon Zeon Co., Ltd., "Butofan LN426C" manufactured by BASF and the like.

The gloves of the present invention can be applied for both household gloves and working gloves. The household gloves generally refer to gloves made of rubber alone and gloves made of rubber and cotton, rayon or the like serving as fluff. The term of "working gloves" is used contrastively with the term of "household gloves". In a working glove, the entire surface of glove made of a knitted, woven or unwoven fabric is coated with a rubber layer, and the surface of the rubber layer from the finger tips to the wrist has projections. However, this is a classification for convenience sake and there is no relationship between actual applications and such terms.

It is a matter of course that, according to the present invention, the laminated part 2 may be formed on the entire glove, instead of on a part of the glove. Also, the present invention can be embodied with the use of other mold than a glove mold.

EXAMPLES

The following description will discuss in detail the present invention with reference to Example thereof. However, the present invention should not be limited to Example set forth in the following.

Example

A glove mold was covered with a glove made of a knitted fabric (hereinafter referred to as knitted glove) with the distance therebetween minimized. The glove mold and the knitted glove were previously heated to about 100° C. and then immersed in natural rubber latex having the following composition, by a depth of about 25 to about 30 cm from the glove finger tips, so that a lower layer of natural rubber was formed on the surface of the knitted glove.

| (Component) | (Dry Parts by Weight) |
| --- | --- |
| High ammonia latex | 100 |
| 10%-Casein solution (containing 5%-ammonia) | 0.1 |
| 10%-Potassium hydroxide solution | 0.4 |

-continued

| (Component) | (Dry Parts by Weight) |
|---|---|
| Acid | (Dropped until the pH reached 8) |
| Vulcanizer (sulfur)*¹ | 1 |
| Zinc oxide*¹ | 1 |
| Vulcanizing accelerator*² | 0.6 |
| Polyvinyl methyl ether*³ | 1 |

*¹: Each of the sulfur and the zinc oxide was added in the form of an aqueous dispersion of which solid content was 50%.
*²: A 45% aqueous solution of dibutyldithiocarbamate sodium salt
*³: A heat-sensitive coagulant The resulting glove was immersed, at its portion from the finger tips to the wrist, in latex of acrylonitrile-butadiene rubber having the following composition. Thus, the lower layer of natural rubber and a surface layer of acrylonitrile-butadiene rubber were laminated on the surface of the knitted glove.

| (Component) | (Dry Parts by Weight) |
|---|---|
| Polyurethane powder (particle size of 0.2 mm) | 25 |
| 20%-Emulvin W aqueous solution*⁴ | 6.5 |
| LX520B*⁵ | 75 |
| Water | (Added such that the entire solid content was equal to 35%) |

*⁴: Emulsifier manufactured by Bayer, Diluted to 1/5 at ratio by weight
*⁵: Trade name of latex of acrylonitrile-butadiene rubber (of which solid content was 40%) manufactured by Nippon Zeon Co., Ltd.

The resulting glove was dried at a room temperature for a few minutes and then vulcanized in an oven at 120° C. for 30 minutes. After being vulcanized, the glove together with the knitted glove was removed from the mold, thus obtaining a working glove. This glove in which the lower layer and the surface layer were sticked to each other with high adhesion, was sufficient to be practically used.

This glove was provided on the surface of the laminated part thereof with projections produced by the polyurethane particles blended with the latex of acrylonitrile-butadiene rubber. In this glove, the thickness of the lower layer (natural rubber layer) was 1.0 mm, while the thickness of the surface layer (acrylonitrile-butadiene rubber layer) except for the projections was 0.05 mm.

The glove (A) thus prepared according to the method above-mentioned was compared with a glove (B) in which both the surface and lower layers were made of natural rubber.

(1) Cost

Since the manufacturing steps for the gloves (A) and (B) are substantially the same, the difference in production cost between the gloves (A) and (B) resides in material cost only. In the glove (A), the acryloni- trile-butadiene rubber layer is very thin, so that increase in material cost is very small. Accordingly, the gloves (A) and (B) are not substantially different in production cost from each other.

(2) Actual Usage

Comparison was made on the gloves (A) and (B) which had been used on an oil-handling job in a glove manufacturing factory for one month. The glove (B) presented partial swelling, separation from the knitted layer, damages to the rubbers and the like. On the other hand, the glove (A) of Example did not present such abnormal phenomena.

What is claimed is:

1. A rubber glove, at least a portion of which comprises a first rubber layer consisting essentially of natural rubber and a second rubber layer consisting essentially of acrylonitrile-butadiene rubber which forms a surface layer of said glove, said first rubber layer being laminated to and in contact with said second rubber layer, and said second rubber layer having a thickness which is less than a thickness of said first rubber layer.

2. A glove according to claim 1, wherein said second rubber layer contains particles for forming non-slip projections.

3. A rubber glove as recited in claim 1, said glove further comprising a glove body of a knitted, woven or unwoven fabric in contact with said first rubber layer.

* * * * *